United States Patent
Rowell et al.

(10) Patent No.: US 8,369,340 B2
(45) Date of Patent: Feb. 5, 2013

(54) TRACKING FRAGMENTED DATA FLOWS

(75) Inventors: David Rowell, Mountain View, CA (US); Jack Kohn, Mountain View, CA (US); Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 315 days.

(21) Appl. No.: 12/889,280

(22) Filed: Sep. 23, 2010

(65) Prior Publication Data

US 2011/0013636 A1      Jan. 20, 2011

Related U.S. Application Data

(63) Continuation of application No. 12/398,571, filed on Mar. 5, 2009, now Pat. No. 7,826,458.

(51) Int. Cl.
*H04L 12/56* (2006.01)

(52) U.S. Cl. .............. 370/395.3; 370/235; 370/394; 370/395.2

(58) Field of Classification Search .......... 370/395, 370/477, 232, 235, 412, 428, 216, 230, 394
See application file for complete search history.

(56) References Cited

U.S. PATENT DOCUMENTS

| | | | |
|---|---|---|---|
| 6,633,565 B1 | 10/2003 | Bronstein et al. | |
| 6,757,249 B1 | 6/2004 | Kejriwal et al. | |
| 6,975,592 B1 | 12/2005 | Seddigh et al. | |
| 7,298,746 B1 | 11/2007 | De La Iglesia et al. | |
| 7,359,983 B1 * | 4/2008 | Maufer et al. | 709/236 |
| 7,420,992 B1 | 9/2008 | Fang et al. | |
| 7,526,607 B1 | 4/2009 | Singh et al. | |
| 7,551,623 B1 | 6/2009 | Feroz et al. | |
| 7,567,504 B2 | 7/2009 | Darling et al. | |
| 7,633,944 B1 | 12/2009 | Chang et al. | |
| 8,170,061 B2 * | 5/2012 | Abe et al. | 370/474 |
| 2003/0126272 A1 | 7/2003 | Corl, Jr. et al. | |
| 2003/0233503 A1 | 12/2003 | Yang et al. | |
| 2004/0008713 A1 | 1/2004 | Knight et al. | |
| 2004/0030745 A1 | 2/2004 | Boucher et al. | |
| 2004/0213152 A1 * | 10/2004 | Matuoka et al. | 370/230 |
| 2005/0243834 A1 * | 11/2005 | Fukuda | 370/395.1 |
| 2005/0286517 A1 | 12/2005 | Babbar et al. | |
| 2006/0059196 A1 | 3/2006 | Sato et al. | |
| 2007/0230493 A1 | 10/2007 | Dravida et al. | |

(Continued)

FOREIGN PATENT DOCUMENTS

CN          1921477          2/2007
WO   WO 2008126228 A1 *   10/2008

OTHER PUBLICATIONS

"IP fragmentation attacks", http://en.wikipedia.org/wiki/IP_fragmentation_attacks, Oct. 17, 2008, 5 pages.

(Continued)

*Primary Examiner* — Dang Ton
*Assistant Examiner* — Robert M Morlan
(74) *Attorney, Agent, or Firm* — Harrity & Harrity, LLP

(57) ABSTRACT

A device may receive a fragment of a fragmented data unit, determine a flow identifier that identifies a data flow with which the fragment is associated, and create a flow entry, based on the flow identifier, to store information associated with the data flow. The device may also determine a fragment key associated with the fragment, store a pointer to the flow entry based on the fragment key, correlate the fragment and another fragment, associated with the data flow, based on the fragment key and the pointer to the flow entry, and accumulate statistics associated with the fragment and the other fragment after correlating the fragment and the other fragment.

22 Claims, 12 Drawing Sheets

U.S. PATENT DOCUMENTS

2008/0065671 A1 3/2008 Dejean et al.
2008/0159140 A1 7/2008 Robinson et al.
2008/0222094 A1 9/2008 Cox
2009/0089505 A1 4/2009 Vasudevan et al.
2009/0116398 A1 5/2009 Shi et al.
2009/0138471 A1 5/2009 Zhang et al.
2009/0161696 A1 6/2009 Song
2010/0226373 A1 9/2010 Rowell et al.

OTHER PUBLICATIONS

European Search Report corresponding to EP 09 17 4230, mailed Jan. 13, 2010, 11 pages.

* cited by examiner

US 8,369,340 B2

TRACKING FRAGMENTED DATA FLOWS

RELATED APPLICATION

This application is a continuation of U.S. application Ser. No. 12/398,571, filed Mar. 5, 2009, the disclosure of which is incorporated herein by reference.

BACKGROUND

Network devices typically use flow tables to track the state of data flows. Flow tables use layer 3 and layer 4 information in packet headers to identify and track individual flows. When packets are fragmented, however, layer 4 information is only carried in the first packet. Second and subsequent packets carry layer 3 information, but not layer 4 information. As a result, a simple flow mapping system (e.g., one that operates based on layer 3 and layer 4 information) does not work for fragmented flows.

SUMMARY

According to one implementation, a method, performed by a device, may include receiving a first fragment of a fragmented data unit; determining a flow identifier that identifies a data flow with which the first fragment is associated; and creating an entry in a flow table, based on the flow identifier, to store information associated with the data flow. The method may also include determining a fragment key associated with the first fragment; creating an entry in a fragment table based on the fragment key; storing, in the entry in the fragment table, a pointer to the entry in the flow table; receiving a subsequent fragment of the fragmented data unit, where the subsequent fragment is received after the first fragment is received; matching the subsequent fragment to the entry in the fragment table; and correlating the subsequent fragment and the first fragment based on the pointer to the entry in the flow table.

According to another implementation, a device may include a first memory, a second memory, and flow identification logic. The first memory may store a flow table that may store an entry associated with a fragment of a fragmented data unit. The second memory may store a fragment table that is separate from the flow table. The flow identification logic may receive another fragment of the fragmented data unit, determine a fragment key associated with the other fragment, locate an entry in the fragment table based on the fragment key, read, from the entry in the fragment table, a pointer to the entry in the flow table, and correlate statistics associated with the fragment and the other fragment based on the pointer to the entry in the flow table.

According to a further implementation, a device may include means for receiving a fragment of a fragmented data unit; means for determining a flow identifier that identifies a data flow with which the fragment is associated; means for creating a flow entry, based on the flow identifier, to store information associated with the data flow; means for determining a fragment key associated with the fragment; means for storing a pointer to the flow entry based on the fragment key; means for correlating the fragment and another fragment, associated with the data flow, based on the fragment key and the pointer to the flow entry; and means for accumulating statistics associated with the fragment and the other fragment after correlating the fragment and the other fragment.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

As described herein, a network device may monitor data flows associated with data units and fragments of data units. For example, the network device may match fragments of data units with the data flows with which the fragments are associated so that the network device can monitor the data flows to, for example, gather statistics, identify unwanted (e.g., malicious) traffic, etc. The term "data unit," as used herein, may refer to a packet, a datagram, or a cell; a fragment of a packet, a datagram, or a cell; or another type or arrangement of data. The term "data flow," as used herein, may refer to a set of data units associated with a same source or destination.

Exemplary Network

Figure 1:
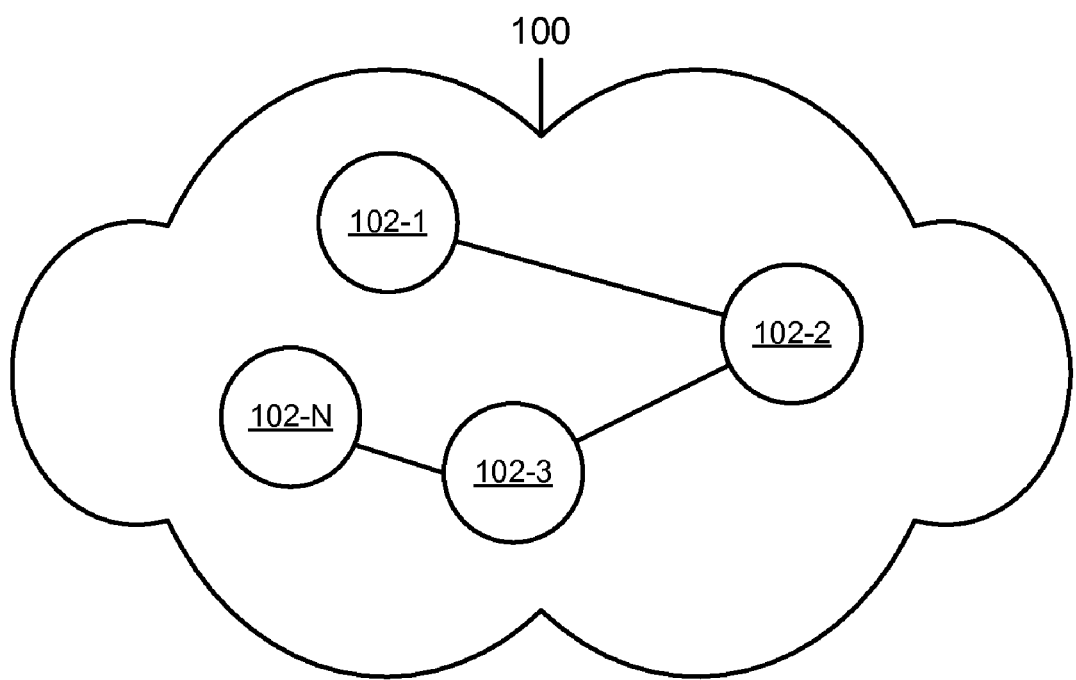
FIG. 1 is a diagram of an exemplary network in which systems and methods, described herein, may be implemented.

FIG. 1 is a diagram of an exemplary network 100 in which systems and methods, described herein, may be implemented. Network 100 may include any type of network, such as the Internet, an ad hoc network, a local area network (LAN), a wide area network (WAN), a metropolitan area network (MAN), a telephone network (e.g., a wireless communication network or the public switched telephone network (PSTN)), or a combination of networks.

As shown, network 100 may include N network devices 102-1 through 102-N (collectively referred to herein as "network devices 102," or individually as "network device 102") (N≧1). Each of network devices 102-1 through 102-N may include a switch, a router, a server, or another type of device. While network devices 102-1 through 102-N can be implemented as different types of devices, in the following paragraphs, network devices 102-1 through 102-N will be described in terms of a router. The links interconnecting network devices 102-1 through 102-N are shown by way of example. Network devices 102-1 through 102-N may be interconnected via different links than those shown in FIG. 1.

Figure 2:
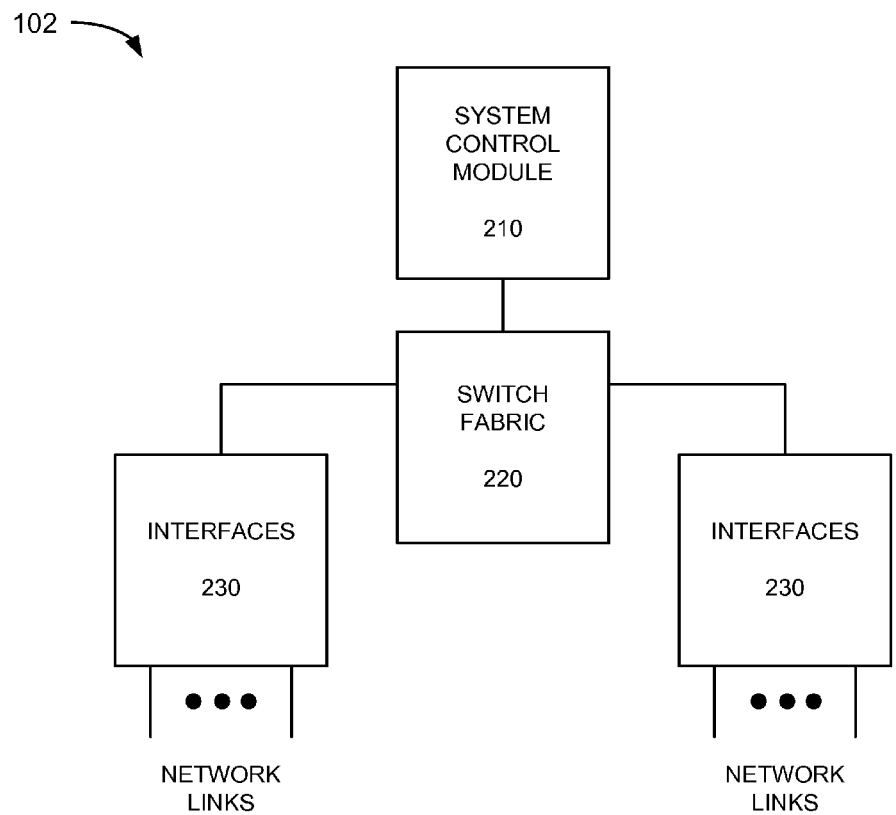
FIG. 2 is a block diagram illustrating exemplary components of a network device of FIG. 1.

FIG. 2 is a block diagram illustrating exemplary components of network device 102. As shown in FIG. 2, network device 102 may include a system control module 210, a switch fabric 220, and a group of interfaces 230. In other implementations, network device 102 may include fewer, additional, different, or differently arranged components than those illustrated in FIG. 2. Also, a function, described as being performed by one component, may be performed by another component or a group of components.

System control module 210 may include one or more processors, microprocessors, application specific integrated circuits (ASICs), field programming gate arrays (FPGAs), and/or processing logic that may be optimized for networking and communications. System control module 210 may perform high level management functions for network device 102. For example, system control module 210 may communicate with other networks and systems connected to network device 102 to exchange information regarding network topology. In some implementations, system control module 210 may include a routing engine for creating routing tables based on network topology information, creating forwarding tables based on the routing tables, and sending these tables to interfaces 230 for data unit routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or more switching planes to facilitate communication among interfaces 230 and/or system control module 210. In one implementation, each of the switching planes may include a single or multi-stage switch of crossbar elements. Switch fabric 220 may also, or alternatively, include processors, memories, and/or paths that permit communication among system control module 210 and interfaces 230.

Interfaces 230 may include devices or assemblies, such as line cards, for receiving incoming data units from network links (or from other interfaces 230) and for transmitting the data units to network links (or to other interfaces 230). For example, interfaces 230 may include Ethernet interfaces, optical carrier (OC) interfaces, and/or asynchronous transfer mode (ATM) interfaces. Interfaces 230 may manage a set of input ports via which data units can be received and a set of output ports via which data units can be transmitted.

Depending on the implementation, the components that are shown in FIG. 2 may provide fewer or additional functionalities. For example, if network device 102 performs an Internet Protocol (IP) data unit routing function as part of a Multi-Protocol Label Switching (MPLS) router, system control module 210 may perform tasks associated with obtaining routing information from other routers in a MPLS network. In such cases, conveying network traffic from one interface to another may involve label-based routing, rather than IP address-based routing.

Figure 3:
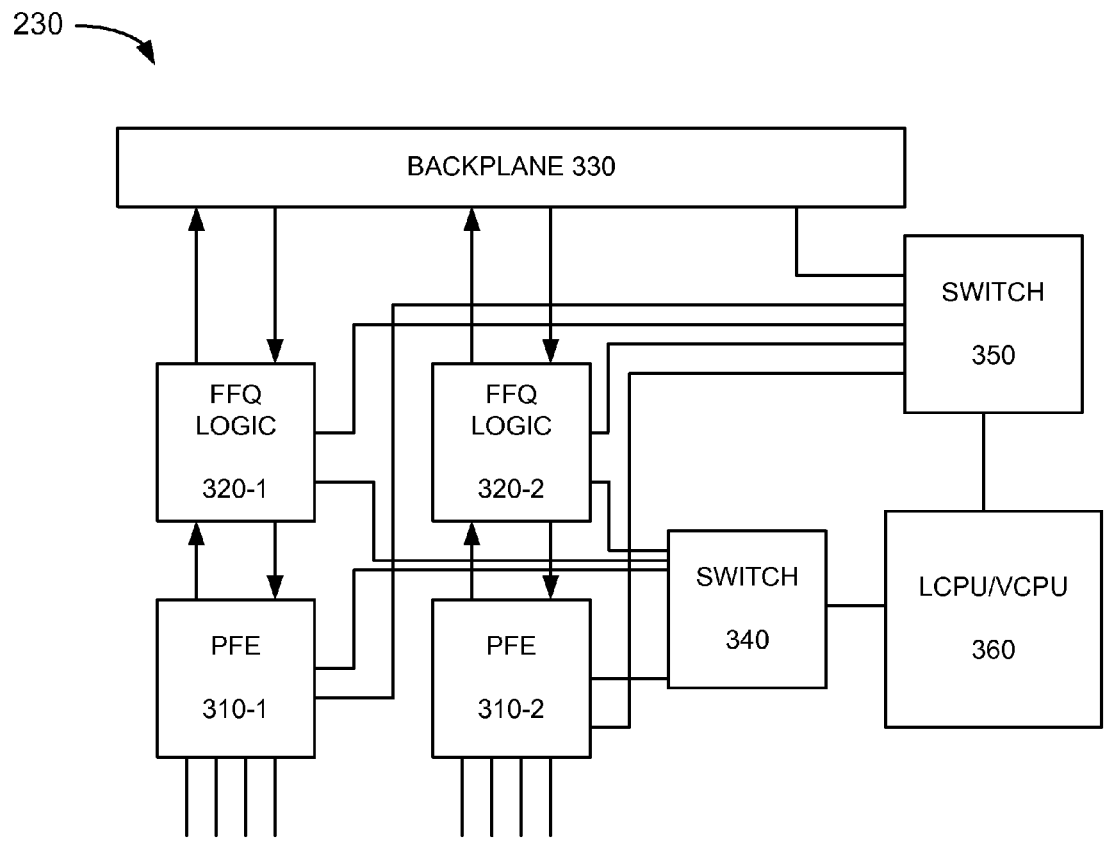
FIG. 3 is a block diagram illustrating exemplary components of an interface of FIG. 2.

FIG. 3 is a block diagram illustrating exemplary components of interface 230. As shown, interface 230 may include packet forwarding engines (PFEs) 310-1 and 310-2 (collectively referred to herein as "PFEs 310," or individually as "PFE 310"), flow management and fabric queuing (FFQ) logic 320-1 and 320-2 (collectively and individually referred to herein as "FFQ logic 320"), backplane 330, switch 340, switch 350, and Local Central Processing Unit/Visibility Central Processing Unit (LCPU/VCPU) 360. In different implementations, interface 230 may include fewer, additional, different, or differently arranged components than those illustrated in FIG. 3.

PFEs 310 may each include hardware, or a combination of hardware and software, that may receive, store, process, and/or forward data units. For example, PFEs 310 may process data units received from incoming network links and prepare data units for transmission on outgoing network links PFEs 310 may make forwarding decisions based on header information of the data units. PFEs 310 may each include a memory to aid in the storing, processing, and/or forwarding of received data units. PFEs 310 may transmit received data units to FFQ logic 320.

FFQ logic 320 may include hardware, or a combination of hardware and software, that may receive data units from PFEs 310 and monitor data flows associated with the data units. In one implementation, FFQ logic 320 may create a table entry for a data flow in a flow table and monitor flow statistics relating to the data flow. In one implementation, FFQ logic 320 may use a timer for each data flow to track the timing of data units for the data flow, and a set of counters for each data flow to track data unit/byte counts for the data flow. In some implementations, FFQ logic 320 may also sample data units and may send sampled data units and other information, such as flow table records, to switch 340 and/or switch 350. FFQ logic 320 may also transmit data units from PFE 310 to backplane 330.

Backplane 330 may include a switching fabric and/or one or more memories that may transmit data units to/from switch fabric 220 (as shown in FIG. 2). Switch 340 may include a high speed switching interface, such as a Peripheral Component Interconnect Express (PCI-E) switch, for transmitting/receiving data units and information between PFEs 310, FFQ logic 320, and/or LCPU/VCPU 360.

Switch 350 may include, for example, an Ethernet switch that may transmit data units and/or information among PFEs 310, FFQ logic 320, and/or LCPU/VCPU 360. Ethernet switch 350 may also transmit and/or receive data units and/or information over an out-of-band plane, via backplane 330 to another device (internal or external to network device 102) for further processing and/or analysis.

Local Central Processing Unit/Visibility Central Processing Unit (LCPU/VCPU) 360 may include one or more processors, microprocessors, ASICs, FPGAs, and/or processing logic that may perform network communications, management, and analysis functions. For example, LCPU/VCPU 360 may control functions related to (local) operations between components shown in FIG. 3 and may control functions related to "visibility" of data units transmitted though interface 230. For example, LCPU/VCPU 360 may manage a flow table of records and/or sample data units. For example, LCPU/VCPU 360 may receive a flow table record and sampled data units from FFQ logic 320. LCPU/VCPU 360 may also transmit flow table records and sampled data units to an external device via Ethernet switch 350.

For example, in managing flow records, LCPU/VCPU 360 may receive flow table records and statistics from FFQ logic 320, aggregate and/or maintain the received flow table records and statistics, and export the aggregated flow table records and/or statistics to another component within network device 102, or alternatively, to a device that is external to network device 102. LCPU/VCPU 360 may aggregate flow table records and/or statistics based on various parameters, such as a communication protocol, a port number, source and/or destination addresses, a source/destination address prefix, a source/destination autonomous system (AS) prefix, etc.

Exemplary Functional Components of FFQ Logic

Figure 4:
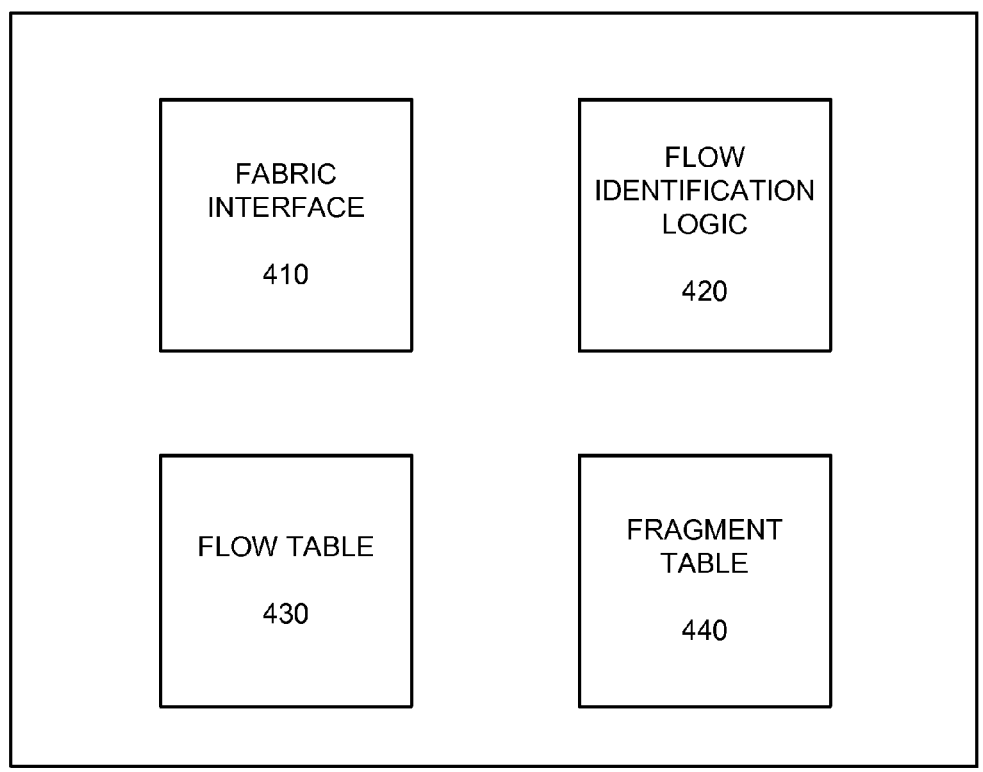
FIG. 4 is a block diagram illustrating exemplary functional components of flow management and fabric queuing logic of FIG. 3.

FIG. 4 is a block diagram illustrating exemplary functional components of FFQ logic 320. As shown in FIG. 4, FFQ logic 320 may include a fabric interface 410, flow identification logic 420, a flow table 430, and a fragment table 440. In another implementation, FFQ logic 320 may include fewer, additional, different, or differently arranged components than those illustrated in FIG. 4. For example, in some implementations, one or more of the functional components of FIG. 4 may be located external to FFQ logic 320. Also, or alternatively, one or more of the functions described as performed by one of the functional components may be performed by another one of the functional components or a group of functional components.

Fabric interface 410 may include hardware, or a combination of hardware and software, that may provide an interface to PFE 310, switch fabric 220, and/or another component of interface 230. Fabric interface 410 may include one or more interfacing queues or buffers (not shown) that may temporarily store data units that have been processed by flow identification logic 420 and that await transmission from FFQ logic 320. In one implementation, fabric interface 410 may include a separate queue for each output port. Additionally, or alternatively, fabric interface 410 may include separate queues for different priority levels that may be assigned to the data units. Thus, fabric interface 410 may include separate queues per port and per priority. In other implementations, fabric interface 410 may include some other arrangement of queues. For example, fabric interface 410 may include auxiliary queues for temporarily storing fragments of a fragmented data unit.

Fabric interface 410 may also include an arbiter that selects data units for transmission from the queues. In one implementation, the arbiter may use a fair selection technique based on data unit priority and/or output port availability. For example, the arbiter may select the highest priority data unit destined for an output port that is available to receive the data unit.

Flow identification logic 420 may include hardware, or hardware in combination with software, that may receive a data unit from PFE 310, determine whether the data unit is a fragmented data unit, determine a flow identifier and/or a fragment key from the data unit (e.g., read the flow identifier/fragment key from the data unit or generate the flow identifier/fragment key based on information in the data unit), provide information regarding the data unit and the flow identifier to create and/or update information regarding the data flow in flow table 430, and/or provide the fragment key to create and/or update information regarding the data flow in fragment table 440. Flow identification logic 420 may identify the flow identifier and/or fragment key from information in the header of the data unit.

For a non-fragmented data unit, for example, the flow identifier may be constructed from information in the data unit header that relates to the source address and the destination address (commonly referred to as layer 3 (L3) information), the source port and the destination port (commonly referred to as layer 4 (L4) information), and/or the protocol information. In one implementation, the flow identifier may be calculated as a hash value of the information in the data unit header, and may be used to identify or create an entry in flow table 430.

For a first fragment of a fragmented data unit, flow identification logic 420 may generate a flow identifier and a fragment key. The flow identifier may be constructed from information in the data unit header that relates to the source address and the destination address (i.e., L3 information), the source port and the destination port (i.e., L4 information), and/or the protocol information. In one implementation, the flow identifier may be calculated as a hash value of the information in the data unit header, and may be used to identify or create an entry in flow table 430. The fragment key may be constructed from information in the data unit header that relates to the L3 information and fragment identification information, which may include a unique value for the fragments associated with a particular data flow. In one implementation, the fragment key may be calculated as a hash value of the L3 information and the fragment identification information, and may be used to identify or create an entry in fragment table 440.

For fragments subsequent to the first fragment of a fragmented data unit, flow identification logic 420 may generate a flow identifier and/or a fragment key. The headers of these fragments may not include L4 information, but may include L3 information and fragment identification information. In this case, the flow identifier and/or the fragment key may be constructed from information in the data unit header that relates to the L3 information and the fragment identification information. In one implementation, the flow identifier and/or the fragment key may be calculated as a hash value of the L3 information and the fragment identification information, and may be used to identify or create an entry in flow table 430 and/or fragment table 440. In one implementation, the flow identifier may match the fragment key for fragments subsequent to the first fragment. In another implementation, the flow identifier may differ from the fragment key for fragments subsequent to the first fragment.

Flow identification logic 420 may, upon identification of the flow identifier associated with a data unit, determine if an entry corresponding to the flow identifier has been previously created in flow table 430. For example, flow identification logic 420 may compare the flow identifier to information in flow table 430 to determine whether there is a match. If no entry exists, a corresponding entry may be created in flow table 430. If, however, a corresponding entry had been previously created in flow table 430 (i.e., at least one prior data unit belonging to the data flow had been previously received by network device 102), flow identification logic 420 may update one or more fields in the corresponding entry to reflect the newly received data unit.

Flow identification logic 420 may, upon identification of the fragment key associated with a data unit, determine if an entry corresponding to the fragment key has been previously created in fragment table 440. For example, flow identification logic 420 may compare the fragment key to information in fragment table 440 to determine whether there is a match. If no entry exists, a corresponding entry may be created in fragment table 440. If, however, a corresponding entry had been previously created in fragment table 440 (i.e., at least one prior data unit belonging to the data flow had been previously received by network device 102), flow identification logic 420 may update or store information relating the entry in fragment table 440 to an entry in flow table 430.

Flow table 430 may be implemented within a memory device, such as one or more dynamic RAMs (DRAMs). Flow table 430 may include a number of entries corresponding to data flows identified by network device 102. For example, each entry in flow table 430 may include a flow identification field used to identify each data flow and other associated fields of information corresponding to data unit handling (e.g., port or interface information, protocol information, etc.). Flow table 430 may include information regarding a large number of data flows, such as over one million data flows.

Figure 5:
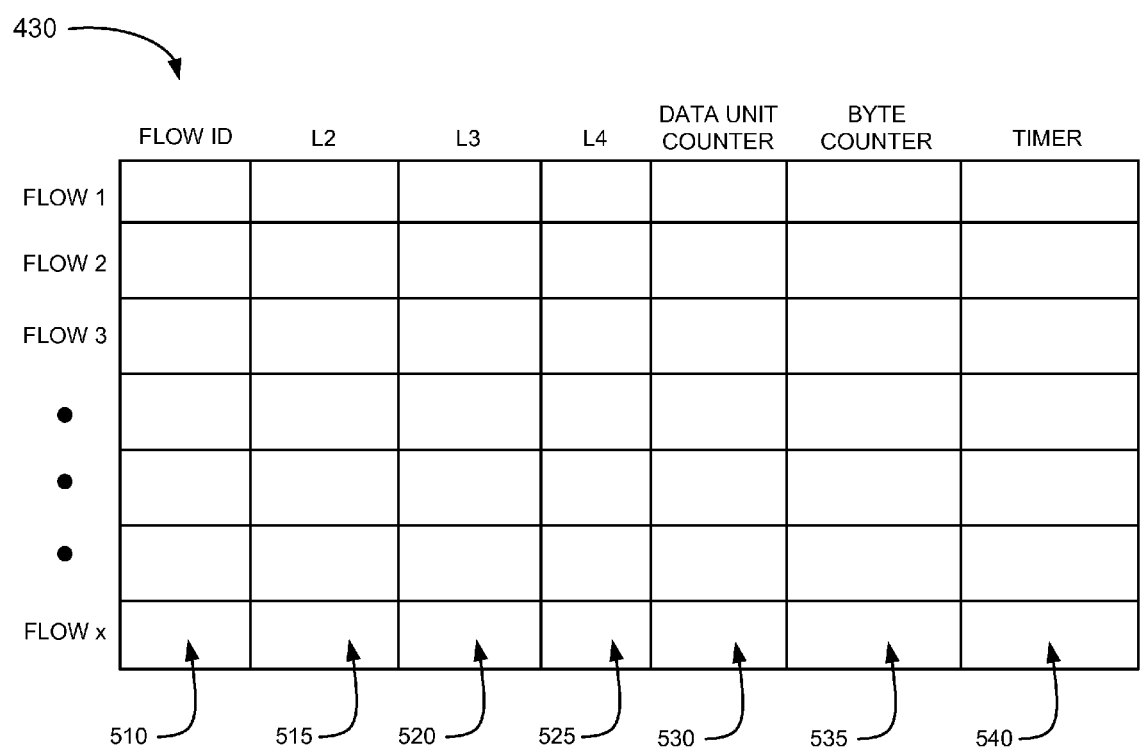
FIG. 5 is a diagram of exemplary fields of the flow table of FIG. 4.

FIG. 5 is a diagram of exemplary fields of flow table 430. As shown in FIG. 5, flow table 430 may include a number of flow table entries for each of data flows 1 through x. Exemplary entries in flow table 430 may include a flow identification (ID) field 510, a layer 2 (L2) information field 515, a layer 3 (L3) information field 520, a layer 4 (L4) information field 525, a data unit counter field 530, a byte counter field 535, and a timer field 540. In other implementations, an entry in flow table 430 may include more, fewer, or different fields. For example, flow ID field 510 may not be an actual field in flow table 430, but may rather represent an address of an entry in flow table 430.

Flow identification field 510 may include a unique, or a substantially unique, flow identifier associated with a particular data flow. For example, a flow identifier may include a value derived from certain information in a header of a data unit (whether fragmented or non-fragmented) corresponding to the data flow. For example, the flow identifier may be constructed from information, in the data unit header, that relates to the L3 information, the L4 information, and/or the protocol information, or that relates to the L3 information and the fragment identification information. In one implementation, the flow identifier may be calculated as a hash value of the information in the data unit header. The flow identifier may provide an efficient way to identify and locate data flows in flow table 430.

L2 information field 515 may include elements of L2 information, such as a source media access control (MAC) address associated with the data unit, a destination MAC address associated with the data unit, etc. L3 information field 520 may include elements of L3 information, such as source and destination IP (Internet Protocol) addresses, a L3 protocol information (e.g., Hypertext Transfer Protocol (HTTP), File Transfer Protocol (FTP), etc. L4 information field 525 may include one or more elements of L4 information, such as source and destination port information (which often designates an application type associated with a data unit), L4 protocol information, etc.

Data unit counter field 530 may include information for accumulating and/or indicating a total number of data units, corresponding to a data flow, that have been passed through interfaces 230 during a particular time period. Byte counter field 535 may include information for accumulating and/or indicating a total number of bytes that have been transferred in the data flow during the particular time period. Timer field 540 may include timing information or a timestamp relating to data units received in the data flow.

In one embodiment, L2 information field 515 may include source and destination MAC addresses, L3 information field 520 may include source and destination IP addresses and a L3 protocol type, and L4 information field 525 may include source and destination ports and a L4 protocol type (for non-fragmented data units and for first fragments of fragmented data units). The value of timer field 540, data unit counter field 530, and byte counter field 535 may be periodically reset or accumulated to provide a total count associated with a particular data flow.

Returning to FIG. 4, fragment table 440 may be implemented within a memory device, such as a content-addressable memory (CAM). Fragment table 440 may store information regarding data unit fragments. In one implementation, fragment table 440 may store a number of entries, where each of the entries may correspond to a data flow associated with a data unit fragment. Fragment table 440 may assist in correlating data unit fragments that are associated with the same data flow.

Figure 6:
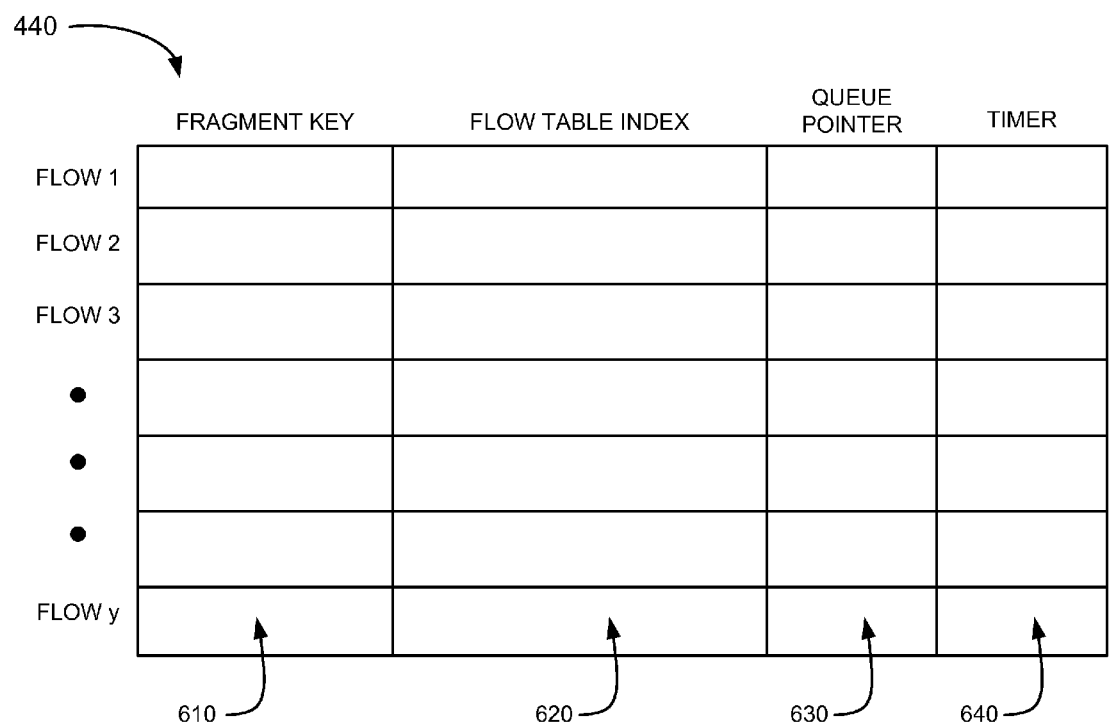
FIG. 6 is a diagram of exemplary fields of the fragment table of FIG. 4.

FIG. 6 is a diagram of exemplary fields of fragment table 440. As shown in FIG. 6, fragment table 440 may include a number of entries for each of data flows 1 through y. Exemplary entries in fragment table 440 may include a fragment key field 610, a flow table index field 620, a queue pointer field 630, and a timer field 640. In other implementations, an entry in fragment table 440 may include additional, fewer, or different fields. For example, fragment key field 610 may not be an actual field in fragment table 440, but may rather represent an address of an entry in fragment table 440.

Fragment key field 610 may include a fragment key, which may be a unique, or a substantially unique, identifier associated with fragments of a particular data flow. For example, a fragment key may include a value derived from certain information in a header of a fragmented data unit, such as information that relates to the L3 information and the fragment identification information. In one implementation, the fragment key may be calculated as a hash value of the information in the data unit header. The fragment key may provide an efficient way to identify and locate fragments associated with particular data flows in fragment table 440.

Flow table index field 620 may include a pointer to an entry in flow table 430 that was created for the first fragment in the same data flow. For example, in one implementation, flow table index field 620 may store the flow identifier that was determined for the first fragment in the data flow. The flow identifier may serve as a pointer to an entry in flow table 430 that corresponds to the data flow associated with a particular data unit fragment.

Queue pointer field 630 may include a pointer to an auxiliary queue (or an address within an auxiliary queue) that stores fragments associated with the data flow. The auxiliary queue may be implemented within fabric interface 410, as described above. The auxiliary queue may store the fragments until the first fragment of the fragmented data unit arrives or the fragments are deleted.

Timer field 640 may include a counter value that can be set, incremented (or decremented), and/or reset. The counter value may be used to determine whether to delete a fragment from the auxiliary queue pointed to by the pointer in queue pointer field 630 and/or to delete the entry from fragment table 440. For example, when a fragment remains in an auxiliary queue for more than a threshold amount of time without an additional fragment being received (based on the information in timer field 640), the fragment may be deleted. Alternatively, or additionally, when an entry remains in fragment table 440 without an additional fragment being received for more than a threshold amount of time (based on the information in timer field 640), the entry may be deleted. In one implementation, the counter value in timer field 640 may be set or reset each time a fragment, in the data flow, is received. The counter value may be incremented (or decremented) for each time interval during which no fragment is received.

Exemplary Process

Figure 7:
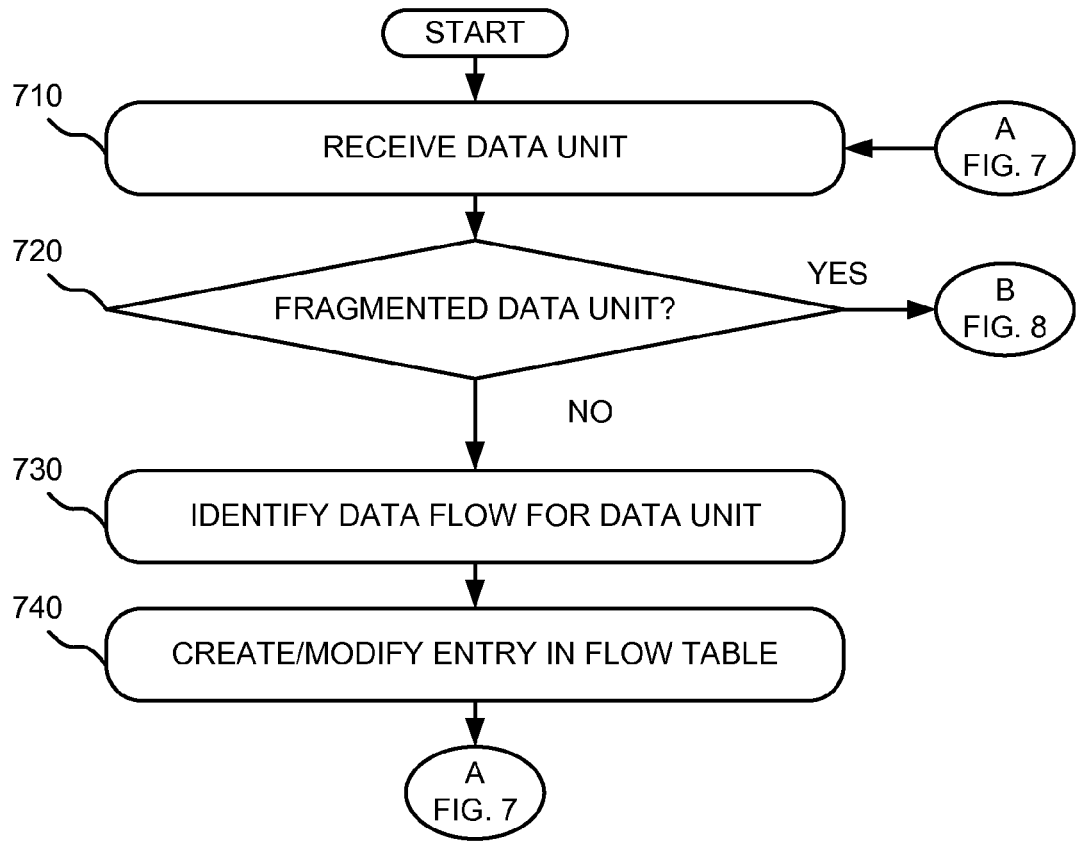
FIGS. 7-10 illustrate a flowchart of an exemplary process for monitoring data flows associated with data units.
Figure 8:
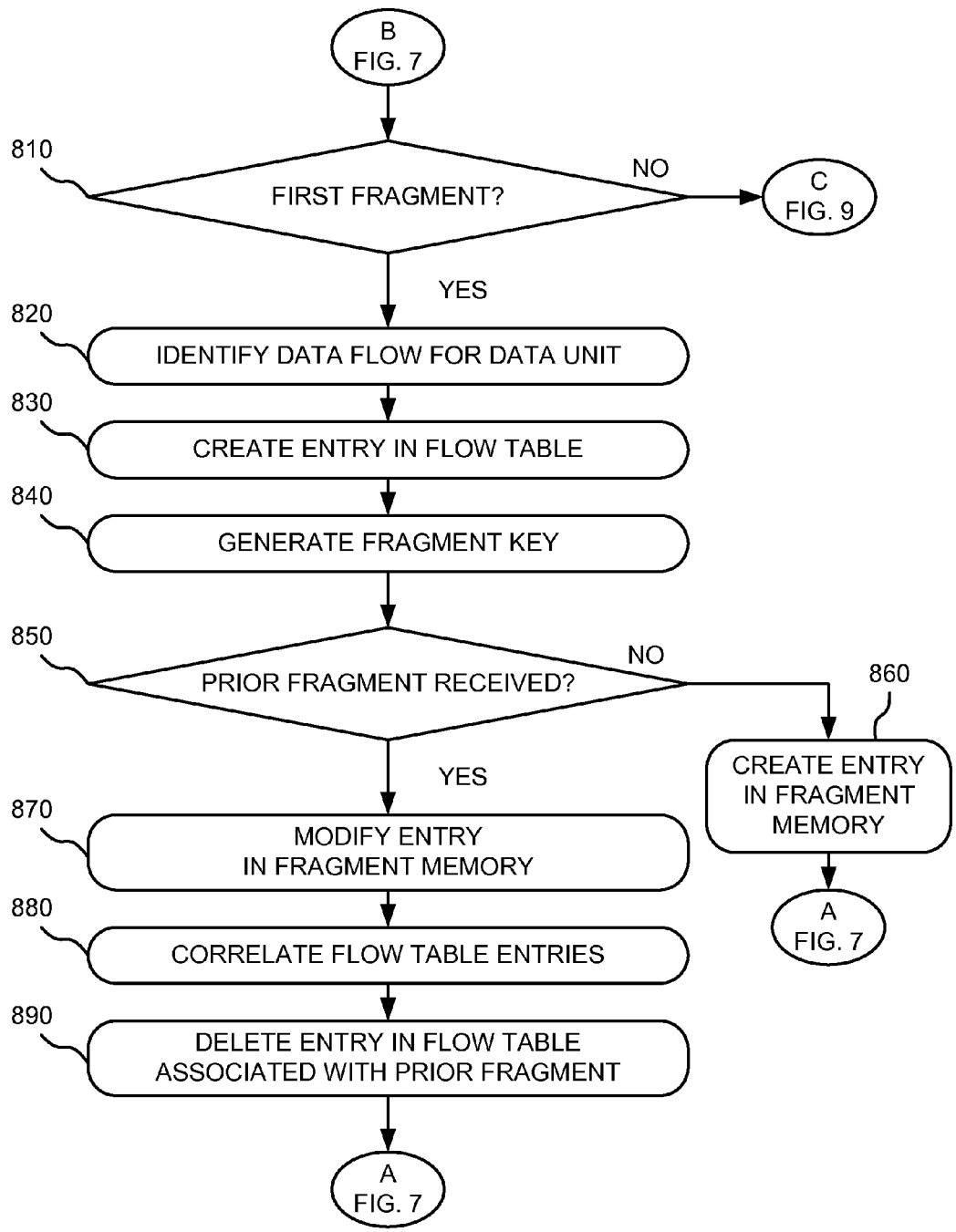
Figure 9:
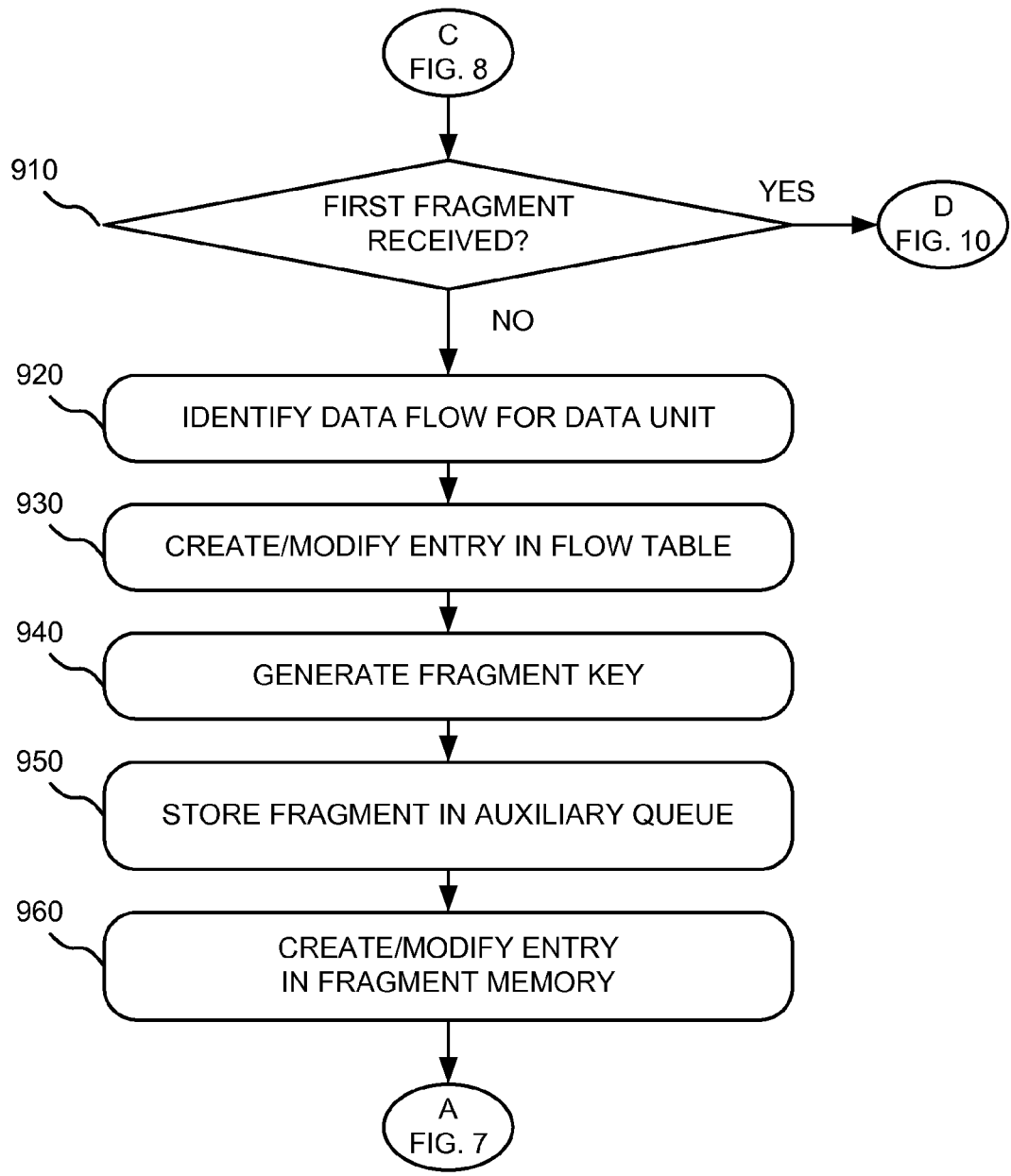

FIGS. 7-9 illustrate a flowchart of an exemplary process for monitoring data flows associated with data units. The process illustrated in FIGS. 7-9 may be performed by FFQ logic 320, LCPU/VCPU 360, and/or another component separate from or in conjunction with FFQ logic 320 and/or LCPU/VCPU 360. The process may begin with a data unit being received (block 710) (FIG. 7). For example, FFQ logic 320 may receive a data unit from PFE 310.

It may be determined whether the data unit is a fragmented data unit (block 720). For example, flow identification logic 410 may determine whether a data unit is a fragmented data unit based on certain information in the header of the data unit. This certain information may include information particular to a fragmented data unit, such as fragment identification information, fragment flags, and/or fragment offset information. The fragment identification information has been described above. The fragment flags may include information that indicates whether a data unit is a fragmented data unit.

The fragment offset information may indicate the fragment's position within the original data unit.

If the data unit is not a fragmented data unit (block 720—NO), the data flow associated with the data unit may be identified (block 730). For example, flow identification logic 420 may determine a flow identifier for the data unit (e.g., read the flow identifier from the data unit or generate the flow identifier from information in the data unit). As described above, flow identification logic 420 may identify the flow identifier from information in the header of the data unit, such as the L3 information (e.g., source address and destination address), the L4 information (e.g., source port and destination port), and/or the protocol information. In one implementation, the flow identifier may be calculated as a hash value of the information in the data unit header.

An entry in flow table 430 may be created or modified (block 740). For example, flow identification logic 420 may search flow table 430, using the flow identifier, to determine whether flow table 430 includes an entry with a matching flow identifier in, for example, flow identification field 510. If flow table 430 includes an entry with a matching flow identifier, this may mean that an entry for the data flow has already been created. In this case, flow identification logic 420 may update information in the entry of flow table 430. For example, flow identification logic 420 may update flow statistics, such as the data count in data unit counter field 530, the byte count in byte counter field 535, and/or timing information in timer field 540 of flow table 430. If flow table 430 does not include an entry with a matching flow identifier, this may mean that the data unit is the first data unit received for this data flow. In this case, flow identification logic 420 may create a new entry in flow table 430. For example, flow identification logic 420 may store various information, such as the information described above with regard to FIG. 5, in an entry of flow table 430. The flow identifier may, in one implementation, identify the location of the entry within flow table 430. In other words, the flow identifier may act as an index into flow table 430.

Flow identification logic 420 may send the data unit, along with information regarding the flow table entry, to LCPU/VCPU 360. LCPU/VCPU 360 may monitor the data flow, such as gather statistics regarding the data flow or identify unwanted (e.g., malicious) traffic. The process of FIGS. 7-9 may return to block 710 where another data unit is received.

If the data unit is a fragmented data unit (block 720—YES), it may be determined whether the data unit is the first fragment of the fragmented data unit (block 810) (FIG. 8). For example, flow identification logic 420 may determine whether a data unit is a first fragment of a fragmented data unit based on the presence (or absence) of L4 information (e.g., source port and destination port) in the header of the data unit. As explained above, the first fragment of a fragmented data unit may include L4 information in its header, but subsequent fragments of the fragmented data unit may not include L4 information in their header. The term "first fragment" is intended to mean the first-created or first-transmitted fragment, not necessarily the initial fragment to arrive at network device 102.

If the data unit is the first fragment of the fragmented data unit (block 810—YES), the data flow associated with the data unit may be identified (block 820). For example, flow identification logic 420 may determine a flow identifier for the data unit (e.g., read the flow identifier from the data unit or generate the flow identifier from information in the data unit). As described above, flow identification logic 420 may identify the flow identifier from information in the header of the data unit, such as the L3 information, the L4 information, and/or the protocol information. In one implementation, the flow identifier may be calculated as a hash value of the information in the data unit header.

An entry in flow table 430 may be created (block 830). For example, flow identification logic 420 may store various information, such as the information described above with regard to FIG. 5, in an entry of flow table 430. The flow identifier may, in one implementation, identify the location of the entry within flow table 430. In other words, the flow identifier may act as an index into flow table 430.

A fragment key may be generated (block 840). For example, flow identification logic 420 may determine the fragment key for the data unit (e.g., read the fragment key from the data unit or generate the fragment key from information in the data unit), or from the information regarding the flow table entry. As described above, flow identification logic 420 may generate the fragment key from information in the header of the data unit, such as the L3 information and the fragment identification information. In one implementation, the fragment key may be generated as a hash value of the information in the data unit header.

It may be determined whether a prior fragment, associated with the same fragmented data unit, has been received (block 850). For example, flow identification logic 420 may search fragment table 440, using the fragment key, to determine whether fragment table 440 includes an entry with a matching fragment key in, for example, fragment key field 610. If fragment table 440 includes an entry with a matching fragment key, this may mean that a fragment (other than the first fragment) on this data flow has already been received. In some situations, fragments may arrive out-of-order at network device 102.

When a prior fragment has not been received (block 850—NO), flow identification logic 420 may create a new entry in fragment table 440 (block 860). For example, flow identification logic 420 may store the fragment key in fragment key field 610 of fragment table 440, and may store a pointer to the entry created in flow table 430 in flow table index field 620 of fragment table 440. The process of FIGS. 7-9 may return to block 710 where another data unit is received.

When a prior fragment has been received (block 850—YES), flow identification logic 420 may update information in the entry of fragment table 440 (block 870). For example, flow identification logic 420 may store a pointer to the entry created in flow table 430 in, for example, flow table index field 620 of fragment table 440. Flow identification logic 420 may also set/reset the counter value in timer field 640.

Entries in flow table 430 may be correlated (block 880). For example, flow identification logic 420 may correlate the first fragment with the earlier fragment(s) via the fragment key and/or the pointer to flow table 430. For example, flow identification logic 420 may update flow statistics, such as the data count in data unit counter field 530, the byte count in byte counter field 535, and/or timing information in timer field 540, in flow table 430. In one implementation, flow identification logic 420 may update the statistics associated with the first fragment with information from the earlier fragment(s). This may permit the data flow to be monitored by, for example, gathering statistics regarding the data flow or identifying unwanted (e.g., malicious) traffic.

The entry in flow table 430, associated with the prior fragment, may be deleted (block 890). For example, flow identification logic 420 may identify the entry in flow table 430 that was created based on the prior fragment, and delete this entry. The process of FIGS. 7-9 may return to block 710 where another data unit is received.

If the data unit is not the first fragment of the fragmented data unit (block 810—NO), it may be determined whether the first fragment has already been received (block 910) (FIG. 9). For example, flow identification logic 420 may generate a fragment key for the fragment and use the fragment key to analyze fragment table 440. If fragment table 440 does not store an entry corresponding to the fragment key, then this is the initial fragment received for this fragmented data unit. Thus, the first fragment has not been received. If fragment table 440 includes an entry corresponding to the fragment, flow identification logic 420 may analyze the entry to determine whether the entry includes information in flow table index field 620. If flow table index field 620 stores a pointer to flow table 430, then the first fragment has already been received. If flow table index field 620 does not store a pointer to flow table 430, then the first fragment has not been received yet.

If the first fragment has not already been received (block 910—NO), the data flow associated with the data unit may be identified (block 920). For example, flow identification logic 420 may determine a flow identifier for the data unit (e.g., read the flow identifier from the data unit or generate the flow identifier from information in the data unit). As described above, flow identification logic 420 may identify the flow identifier from information in the header of the data unit. In this situation, however, since the data unit is a fragmented data unit and does not contain L4 information, flow identification logic 420 may generate the flow identifier based on the L3 information and the fragment identification information (similar to the way that the fragment key is generated). In one implementation, the flow identifier may be calculated as a hash value of the information in the data unit header.

An entry in flow table 430 may be created or modified (block 930). For example, flow identification logic 420 may store various information, such as the information described above with regard to FIG. 5, in an entry of flow table 430. The flow identifier may, in one implementation, identify the location of the entry within flow table 430. In other words, the flow identifier may act as an index into flow table 430. If no entry already exists in flow table 430 (e.g., in the situation where this fragment is the initial fragment received for the fragmented data unit), flow identification logic 420 may create an entry in flow table 430 and store information, regarding the fragment, in appropriate fields of the entry. If an entry already exists in flow table 430 (e.g., in the situation where a prior fragment, other than the first fragment, has already been received for the fragmented data unit), flow identification logic 420 may identify the entry using the flow identifier and update fields of the entry with information regarding the fragment.

A fragment key may be generated (block 940), if the fragment key has not already been generated in block 910. For example, flow identification logic 420 may determine the fragment key for the data unit (e.g., read the fragment key from the data unit or generate the fragment key from information in the data unit), or from the information regarding the flow table entry. As described above, flow identification logic 420 may generate the fragment key from information in the header of the data unit, such as the L3 information and the fragment identification information. For example, the fragment key may be generated as a hash value of the information in the data unit header.

The fragment may be stored in an auxiliary queue (block 950). For example, flow identification logic 420 may instruct fabric interface 410 to store the fragment in an auxiliary queue.

An entry in fragment table 440 may be created or modified (block 960). For example, flow identification logic 420 may search fragment table 440, using the fragment key, to determine whether fragment table 440 includes an entry with a matching fragment key in, for example, fragment key field 610. If fragment table 440 includes an entry with a matching fragment key, this may mean that a fragment, for this data flow, has already been received. In this situation, flow identification logic 420 may correlate this fragment with the earlier fragment via the fragment key. Flow identification logic 420 may also store a pointer, to the auxiliary queue (or an address in the auxiliary queue) that stores the fragment, in queue pointer field 630. Flow identification logic 420 may also set/reset the counter value in timer field 640.

If fragment table 440 does not include an entry with a matching fragment key, flow identification logic 420 may create an entry in fragment table 440. For example, flow identification logic 420 may store the fragment key in fragment key field 610 of fragment table 440. In one implementation, flow identification logic 420 may leave the information in flow table index field 620 of fragment table 440 unchanged (e.g., empty) or may set the information in flow table index field 620 to a particular value that indicates that no pointer to flow table 430 is available. Flow identification logic 420 may also store a pointer, to the auxiliary queue (or an address in the auxiliary queue) that stores the fragment, in queue pointer field 630. Flow identification logic 420 may also set/reset the counter value in timer field 640. The process of FIGS. 7-9 may return to block 710 where another data unit is received.

Figure 10:
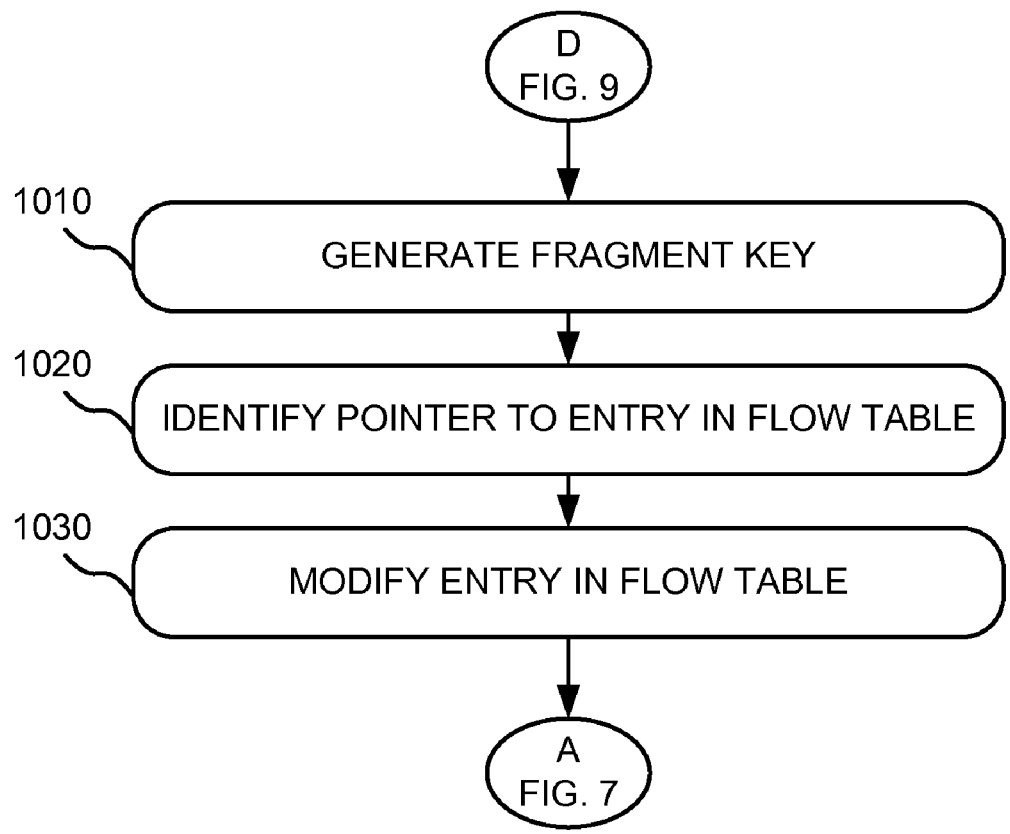

If the first fragment has already been received (block 910—YES), then a fragment key may be generated (block 1010) (FIG. 10), if the fragment key has not already been generated in block 910. For example, flow identification logic 420 may determine the fragment key for the data unit (e.g., read the fragment key from the data unit or generate the fragment key from information in the data unit). As described above, flow identification logic 420 may generate the fragment key from information in the header of the data unit, such as the L3 information and the fragment identification information. For example, the fragment key may be generated as a hash value of the information in the data unit header.

A pointer to an entry in flow table 430 may be identified (block 1020). For example, flow identification logic 420 may search fragment table 440, using the fragment key, to identify an entry with a matching fragment key in, for example, fragment key field 610. Flow identification logic 420 may read a pointer to an entry in flow table 430 from, for example, flow table index field 620.

The entry in flow table 430 may be modified (block 1030). For example, flow identification logic 420 may correlate the fragment with earlier fragment(s) via the pointer to the entry in flow table 430. For example, flow identification logic 420 may update flow statistics, such as the data count in data unit counter field 530, the byte count in byte counter field 535, and/or timing information in timer field 540, in flow table 430. In one implementation, flow identification logic 420 may update the statistics associated with the first fragment with information from the subsequent fragment(s). This may permit the data flow to be monitored by, for example, gathering statistics regarding the data flow or identifying unwanted (e.g., malicious) traffic. The process of FIGS. 7-9 may return to block 710 where another data unit is received.

During the process of FIGS. 7-9, certain information may be transmitted to LCPU/VCPU 360. As described above, LCPU/VCPU 360 may store a copy of flow table 430. LCPU/VCPU 360 may receive information, regarding the correlation of fragments of fragmented data units, from FFQ logic 320 and update its copy of flow table 430. Based on the information in its copy of flow table 430, LCPU/VCPU 360 may perform certain operations on fragmented data units, such as sampling, mirroring, rate limiting, dropping, or the like.

EXAMPLES

Figure 11A:
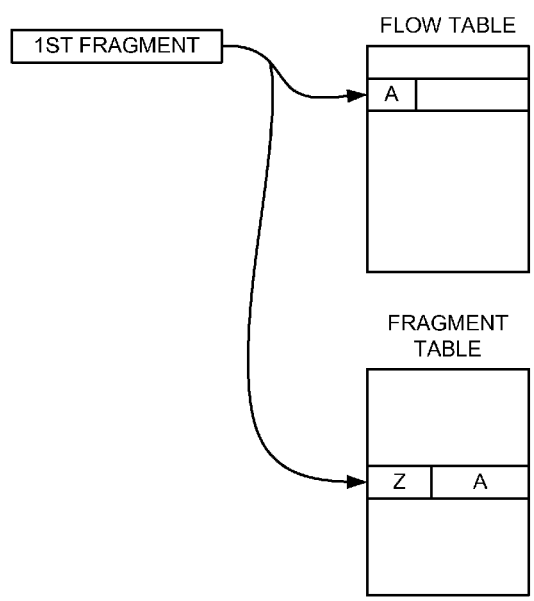
FIGS. 11A and 11B are diagrams illustrating an example of a process described herein.
Figure 11B:
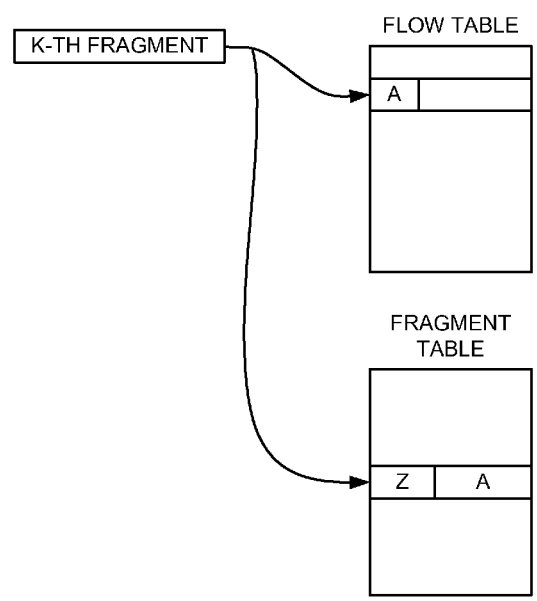

FIGS. 11A and 11B are diagrams illustrating an example of a process described herein. As shown in FIG. 11A, a first fragment of a fragmented data unit may be received. Assume that the first fragment is also the initial fragment received for the data flow associated with the fragmented data unit. An entry may be created in the flow table. For example, a flow identifier may be determined based on information in the first fragment, such as the L3 information, the L4 information, and/or the protocol information, as described above. Assume that the flow identifier corresponds to a value of "A." The entry may be stored in the flow table at the address location corresponding to the flow identifier value of A.

An entry may also be created in the fragment memory. For example, a fragment key may be determined based on information in the first fragment, such as the L3 information and the fragment identification information, as described above. Assume that the fragment key corresponds to a value of "Z." The entry may be stored in the fragment memory at the address location corresponding to the fragment key value of Z. The entry may store a pointer to the entry created in the flow table. As shown in FIG. 11A, the entry may store the value of A, which may be used as a pointer (or index) into the flow table.

Now assume that another fragment (K-th fragment, where K>1) of the fragmented data unit is received, as shown in FIG. 11B. Assume that the K-th fragment belongs to the same data flow as the first fragment and is received at some point after the first fragment is received. A fragment key may be determined (e.g., generated based on information in the first fragment, such as the L3 information and the fragment identification information, as described above). The fragment table may be searched based on the fragment key. For example, assume that the fragment key corresponds to a value of "Z." The entry Z may be identified and the pointer to a flow table entry may be read from the entry. This may permit the later fragment (i.e., K-th fragment) to be correlated to the earlier fragment (i.e., first fragment). As a result, data flow statistics, or other data flow information, may be accumulated for the different fragments associated with the same data flow.

Figure 12A:
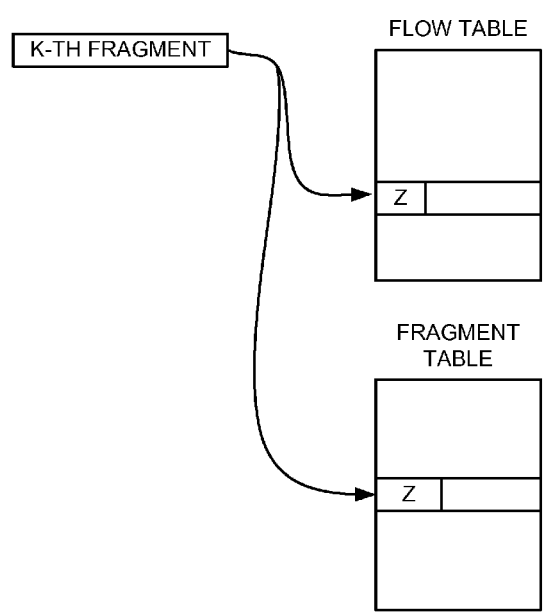
FIGS. 12A and 12B are diagrams illustrating another example of a process described herein.
Figure 12B:
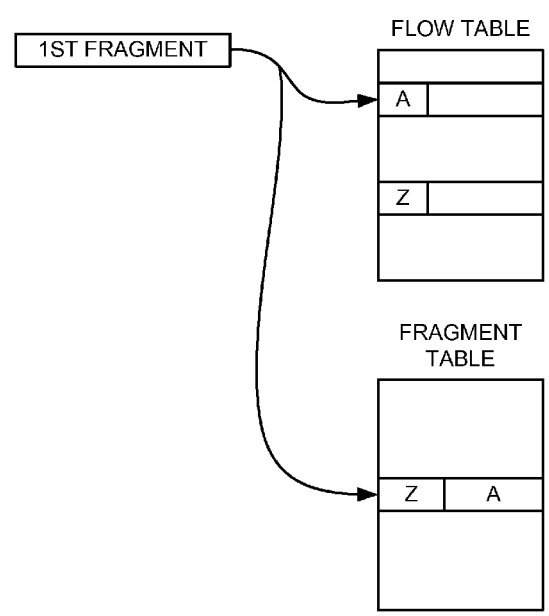

FIGS. 12A and 12B are diagrams illustrating another example of a process described herein. As shown in FIG. 12A, assume that the K-th fragment (where K>1) of a fragmented data unit is received, and that the K-th fragment is received prior to the first fragment in the same data flow. An entry may be created in the flow table. For example, a flow identifier may be determined based on information in the K-th fragment. Because the K-th fragment is not the first fragment, the K-th fragment may not include L4 information. As a result, the flow identifier may be generated based on other information, such as the L3 information and the fragment identification information, as described above. Assume that the flow identifier corresponds to a value of "Z." The entry may be stored in the flow table at the address location corresponding to the flow identifier value of Z.

The fragment table may be searched based on the fragment key. For example, a fragment key may be determined (e.g., either the same as the flow identifier or generated based on information in the first fragment, such as the L3 information and the fragment identification information, as described above). Assume that the fragment key corresponds to a value of "Z." In this case, there is no entry in the fragment table corresponding to the fragment key of Z. As a result, an entry may be created in the fragment table and stored in the fragment table at the address location corresponding to the fragment key of Z.

Now assume that the first fragment in the data flow is received, as shown in FIG. 12B. An entry may be created in the flow table. For example, a flow identifier may be determined based on information in the first fragment, such as the L3 information, the L4 information, and/or the protocol information, as described above. Assume that the flow identifier corresponds to a value of "A." The entry may be stored in the flow table at the address location corresponding to the flow identifier value of A.

The fragment table may be searched based on the fragment key. For example, a fragment key may be determined (e.g., generated based on information in the first fragment, such as the L3 information and the fragment identification information, as described above). Assume that the fragment key corresponds to a value of "Z." In this case, there is already an entry in the fragment table corresponding to the fragment key of Z. As a result, the entry may be modified to store the pointer to the entry created in the flow table. As shown in FIG. 12B, the fragment table entry may be modified to store the value of A (which may be a pointer (or index) into the flow table). This may permit the later fragment (i.e., first fragment) to be correlated to the earlier fragment (i.e., K-th fragment). As a result, data flow statistics, or other data flow information, may be accumulated for the different fragments associated with the same data flow. For example, data flow statistics from the earlier-created flow table entry (i.e., the entry corresponding to the flow identifier value of Z) may be combined with the data flow statistics from the later-created flow table entry (i.e., the entry corresponding to the flow identifier value of A). Also, the earlier-created flow table entry, based on the K-th fragment, may be deleted.

As explained above, the K-th fragment may be stored in an auxiliary queue to await reception of the first fragment. When the first fragment arrives, the first fragment and the K-th fragment may be outputted for further processing. If, however, a threshold amount of time occurs between reception of successive fragments, the K-th fragment may be deleted from the auxiliary queue and/or the entry in the fragment table may be deleted. A benefit of this technique is that it will naturally filter fragment-based denial of service attacks where a series of fragments (deliberately excluding the first fragment) are randomly transmitted.

Conclusion

Implementations, described herein, may facilitate the monitoring of data flows that include fragmented data units. Based on these implementations, certain benefits may be achieved. For example, the quantity of data flows, with out-of-order fragments that are active at any given time, may be used as a measure of health (or security) of a network. Also, even if subsequent fragments arrive ahead of the first fragment, all of the fragments can still be subjected to various actions that are performed on the flow table because these subsequent fragments are matched to the later-received first fragment via the fragment table. Further, the network device can reorder out-of-order fragments into the correct data unit order. This may improve the performance of some end-devices, such as servers.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a processor).

Further, a flow table and a fragment table have been described. The term "table," as used herein, may refer to any searchable form or arrangement of data within a memory.

It will be apparent that aspects described herein may be implemented in many different forms of software, firmware, and hardware in the implementations illustrated in the figures. The actual software code or specialized control hardware used to implement these aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device, comprising:
   a memory to store instructions; and
   a processor to execute the instructions to:
   receive, prior to receiving an initial data unit of a data flow, a data unit of the data flow that was transmitted subsequent to the initial data unit,
   create a temporary entry in a flow table based on information associated with the data unit,
   create an entry in a fragment table based on a fragment key, where the fragment key is generated based on information associated with the data unit,
   create another entry in the flow table based on information in the initial data unit when the initial data unit is received, and
   modify, when the initial data unit is received, the entry in the fragment table to include a reference to the other entry in the flow table.

2. The device of claim 1, where, when creating the temporary entry in the flow table, the processor is further to:
   store a flow identifier associated with the data unit, where the flow identifier is generated based on information that includes layer 3 information and a fragment identification, where the information on which the flow identifier is based is different from information used to create a flow identifier for the initial data unit.

3. The device of claim 2, where, when creating the temporary entry in the flow table, the processor is further to:
   store the temporary entry at an address location corresponding to a value associated with the flow identifier associated with the data unit.

4. The device of claim 1, where, when creating the other entry in the flow table, the processor is further to:
   store a flow identifier associated with the initial data unit, where the flow identifier is generated based on information that includes layer 3 information and layer 4 information, where the information on which the flow identifier is based is different from information used to create a flow identifier for the data unit.

5. The device of claim 1, where, when generating the fragment key, the processor is further to:
   generate the fragment key based on information from the data unit that includes layer 3 information and a fragment identification.

6. The device of claim 1, where, when creating the entry in the fragment table, the processor is further to:
   create the entry without a reference to the temporary entry in the flow table.

7. The device of claim 1, where the processor is further to:
   search for a stored entry in the fragment table that matches the fragment key prior to creating the entry in the fragment table.

8. The device of claim 7, where, when creating the entry in the fragment table, the processor is further to:
   modify the stored entry in the fragment table to store a reference to the temporary entry created in the flow table when the search for an entry in the fragment table reveals a match.

9. The device of claim 1, where the processor is further to:
   delete the temporary entry in the flow table when the initial data unit is received.

10. The device of claim 1, where the processor is further to:
    store the data unit in an auxiliary queue to await reception of the initial data unit.

11. The device of claim 10, where, when storing the data unit in the auxiliary queue, the processor is further to:
    delete the data unit from the auxiliary queue when a threshold amount of time elapses between reception of the data unit and another data unit of the data flow.

12. A method performed by a device, the method comprising:
    receiving, by the device and prior to receiving an initial data unit of a data flow, a data unit of the data flow that was transmitted subsequent to the initial data unit;
    creating, by the device, a temporary entry in a flow table based on information associated with the data unit;
    generating, by the device, a fragment key based on information associated with the data unit;
    creating, by the device, an entry in a fragment table based on a fragment key;
    creating, by the device, another entry in the flow table based on information in the initial data unit when the initial data unit is received; and
    modifying, by the device and when the initial data unit is received, the entry in the fragment table to include a reference to the other entry in the flow table.

13. The method of claim 12, where creating the temporary entry in the flow table further comprises:

generating a flow identifier, for the data unit, based on information that includes layer 3 information and a fragment identification, where the information on which the generated flow identifier is based is different from information used to generate a flow identifier for the initial data unit, storing the flow identifier associated with the data unit.

14. The method of claim 12, where creating the other entry in the flow table further comprises:

generating a flow identifier, for the initial data unit, based on information that includes layer 3 information and layer 4 information, where the information on which the generated flow identifier is based is different from information used to generate a flow identifier for the data unit, storing a flow identifier associated with the initial data unit.

15. The method of claim 12, where generating the fragment key further comprises:

generating the fragment key based on information from the data unit that includes layer 3 information and fragment identification.

16. The method of claim 12, where creating the entry in the fragment table further comprises:

creating the entry without a reference to the temporary entry in the flow table.

17. The method of claim 12, further comprising:

searching for an entry in the fragment table that matches the fragment key prior to creating the entry in the fragment table.

18. The method of claim 17, where creating the entry in the fragment table further comprises:

modifying the entry in the fragment table to store a reference to the entry created in the flow table when the search for an entry in the fragment table reveals a match.

19. A method performed by a device, the method comprising:

determining, by the device, a flow identifier that identifies a data flow associated with a received fragment of a fragmented data unit;

creating, by the device, an entry in a flow table, based on the flow identifier, to store information associated with the data flow;

determining, by the device, a fragment key associated with the fragment;

creating, by the device, an entry in a fragment table based on the fragment key;

storing, by the device and in the entry in the fragment table, a reference to the entry in the flow table;

correlating, by the device, any subsequently received fragments, from the data flow, with the fragment based on the reference to the entry in the flow table.

20. The method of claim 19, where determining the flow identifier includes:

identifying information in a header of the fragment, and generating the flow identifier based on the information in the header.

21. The method of claim 19, where determining the fragment key includes:

identifying information in a header of the fragment, and generating the fragment key based on the information in the header.

22. The method of claim 19, further comprising:

matching at least one of the subsequently received fragments to the entry in the fragment memory, where the matching includes:

generating another fragment key associated with one of the subsequently received fragments, and using the other fragment key to locate the entry in the fragment table.

\* \* \* \* \*